Figure 1:
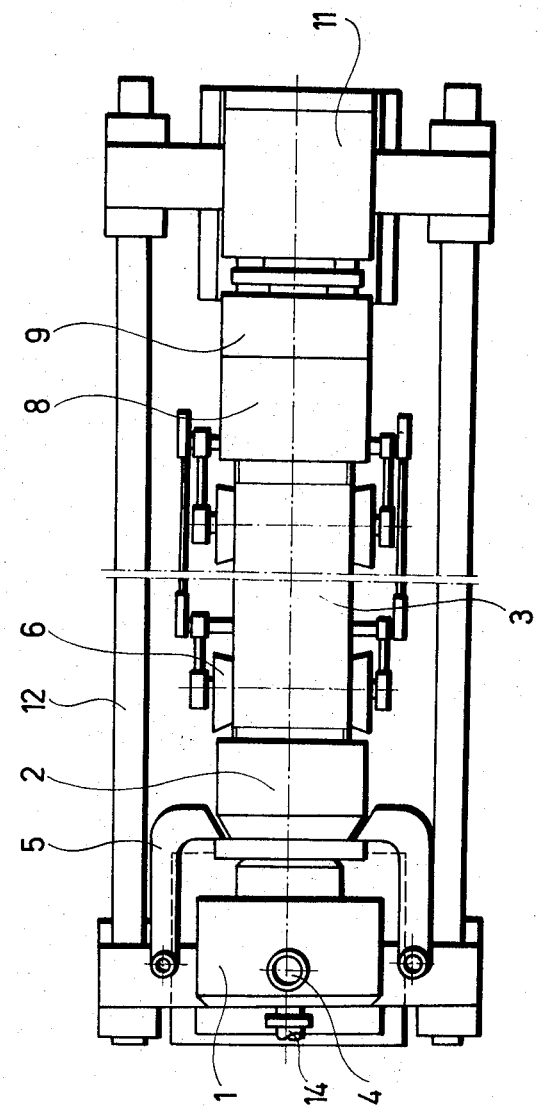

United States Patent [19]
Illyes et al.

[11] 3,760,632
[45] Sept. 25, 1973

[54] PRESSURE TESTING MACHINES FOR TUBES

[75] Inventors: Sandor Illyes; Otto Kapas, both of Budapest, Hungary

[73] Assignee: Csepeli Tervezo Intezet, Budapest, Hungary

[22] Filed: Dec. 1, 1971

[21] Appl. No.: 203,741

[30] Foreign Application Priority Data
Dec. 4, 1970 Hungary .......................... CE-800

[52] U.S. Cl. .................................. 73/49.6, 138/90
[51] Int. Cl. ............................................ G01m 3/04
[58] Field of Search ................. 73/49.6, 49.1, 49.5, 73/40; 285/5; 138/90

[56] References Cited
UNITED STATES PATENTS

| | | | |
|---|---|---|---|
| 2,565,460 | 8/1951 | Woodlief | 73/49.6 |
| 2,671,339 | 3/1954 | Krause et al. | 73/49.6 |
| 2,725,743 | 12/1955 | Reichl | 73/49.6 |
| 2,896,445 | 7/1959 | McMabb | 73/49.6 |
| 3,001,802 | 9/1961 | Rebman et al. | 285/35 |
| 3,587,294 | 6/1971 | Kost | 73/49.5 |
| 3,618,366 | 11/1971 | Pauls et al. | 73/49.5 |

Primary Examiner—Louis J. Capozi
Attorney—Irvin S. Thompson et al.

[57] ABSTRACT

In a machine for testing tubes by the application of high pressure liquid to its interior, one tube end is secured to a first cap connected to a stationary sealing head by a permanent seal. The other tube is secured to a second cap in turn connected to a ram mounted in a second sealing head displaceable longitudinally of the tube being tested. The first cap has a liquid inlet connectable to the high pressure supply, and two back pressure valves of opposite opening directions.

9 Claims, 2 Drawing Figures

PRESSURE TESTING MACHINES FOR TUBES

This invention concerns pressure testing machines for tubes, particularly, but not exclusively for testing steel tubes at high liquid pressures, the machines each comprising a stationary sealing head capable of clamping the tubes to be tested and sealing them against high liquid pressures, and a displaceable sealing head movable in dependence on the length of the tube being tested.

In the manufacture of e.g. steel tubes, pressure testing is one of the recognized quality control processes. The aim of pressure testing is to establish the pressure resistance and liquid-tightness of the tube before the latter is brought into commercial use.

For the purposes of pressure testing, pressure testing machines have been employed which carry out the test in the following way:

the tube is placed horizontally in the pressure testing machine, and one of its ends is closed off by a stationary sealing head, while the other end is closed off by a sealing head movable axially along the tube;

through the stationary sealing head the tube is filled with low pressure liquid and vented of air;

from the low pressure liquid supply a switch-over is made to a high pressure liquid supply network, the stipulated test pressure is established and maintained in the interior of the tube for the stipulated period;

the liquid pressure-tested tube is observed directly or indirectly to see whether any flow occurs across the tube wall;

the tested tube is classified and marked according to whether, at the preset pressure, it lets flow through (faulty) or not (satisfactory), and on this basis subsequently sorted;

the high pressure is taken off the tube, the excess liquid which established the design high pressure, is drained from the tube;

the movable sealing head is removed from the tube end and the tube is lifted out of the testing machine, while the liquid drains from it.

It is a common characteristic of known tube pressure testing machines that the clamping and liquid flow sealing are effected by a stationary sealing head and a sealing head movable in dependence on tube length. These sealing heads seal the tube ends most commonly either by closing off the tube ends, which have been cut normally to the tube axis, with a planar sealing sheet, or by cylindrically surrounding a predetermined length of the exterior of tube end with a sealing ring or rings.

The above-mentioned sealing methods employed in known tube testing machines have the following drawbacks:

a. The high testing pressure introduced into the tube acts not only on the interior of the tube, but also acts to exert a force directly (in the case of external sealing) in a plane perpendicular to the tube axis on the surface of the tube end defined between the inner and outer diameters, this force being in an axial direction of the tube towards the opposite end; or the pressure acts indirectly (in the case of employing planar sealing sheets) to exert a force in an axial direction relative to the tube, as a consequence of the clamping effect - exerted for achieving good sealing - of the two sealing sheets of the sealing heads. As a result of either of these forces the tube is longitudinally compressed and tends to be bent outwardly during testing. To prevent the outward bending of the tube, clamping arms along the length of the tube had to be used in known tube pressure testing machines.

b. Owing to technological difficulties in tube manufacture, it is not possible to ensure perfect geometrical uniformity of the tube ends, not even for the same tube types. The dimensional variations, especially for tube testing at high liquid pressures ($300 - 1500$ kp/cm$^3$), make it impossible for known methods to achieve, with the desired economy, the effective sealing of tube ends.

c. Known pressure testing machines longitudinally compress the tubes, whereby pressure stresses arise in the tube material. In these machines one cannot test the tubes in a longitudinal stress-free, or tensile-stressed condition, i.e. one cannot achieve the loads to which the tube may be subjected when used for the designed purpose.

This invention aims to eliminate the above-mentioned disadvantages of known machines, and seeks to ensure that testing of e.g. steel tubes at various liquid pressures can be carried out with the tube being either in a longitudinally compressed or tensioned, or in a stress-free, condition, in accordance with the loads arising in the designed use of the tube.

According to the invention, there is provided a pressure testing machine for tubes by the application of high liquid pressures, comprising a first stationary sealing head for gripping the tube being tested, a first closure cap adapted sealingly to be secured to one end of the said tube, a liquid inlet aperture in the first cap, a permanent seal for connecting the first cap to the stationary sealing head, the dimensions of said permanent seal being independent of the diameter of said tube, means in said stationary sealing head for connecting the said inlet aperture to a source of high pressure liquid, a second sealing head displaceable along the axis of said tube to accommodate the entire length of the tube, a second closure cap adapted sealingly to be secured to the other end of said tube, a movable supporting member connected to the second cap, and pressure application means connecting said second sealing head to the said supporting member so as to exert in operation a compressive or tensile force on said other end of the tube.

The greatest advantage of the tube pressure testing machine according to the invention is that during testing the tube may be loaded in tension also, and further that the security of any screw threads that may be formed on the tube ends to secure the said caps thereto can be tested simultaneously with their sealing property.

A further advantage is that the caps may be fixed to the tube ends in advance so as to enable the test period to be shortened, since the tubes to be tested can then be pre-filled with liquid and need to be in the pressure testing machine only during the actual pressure test.

The tensile force acting on the tube may be regulated by a counter-supporting ram associated with one of the closure caps.

Figure 2:
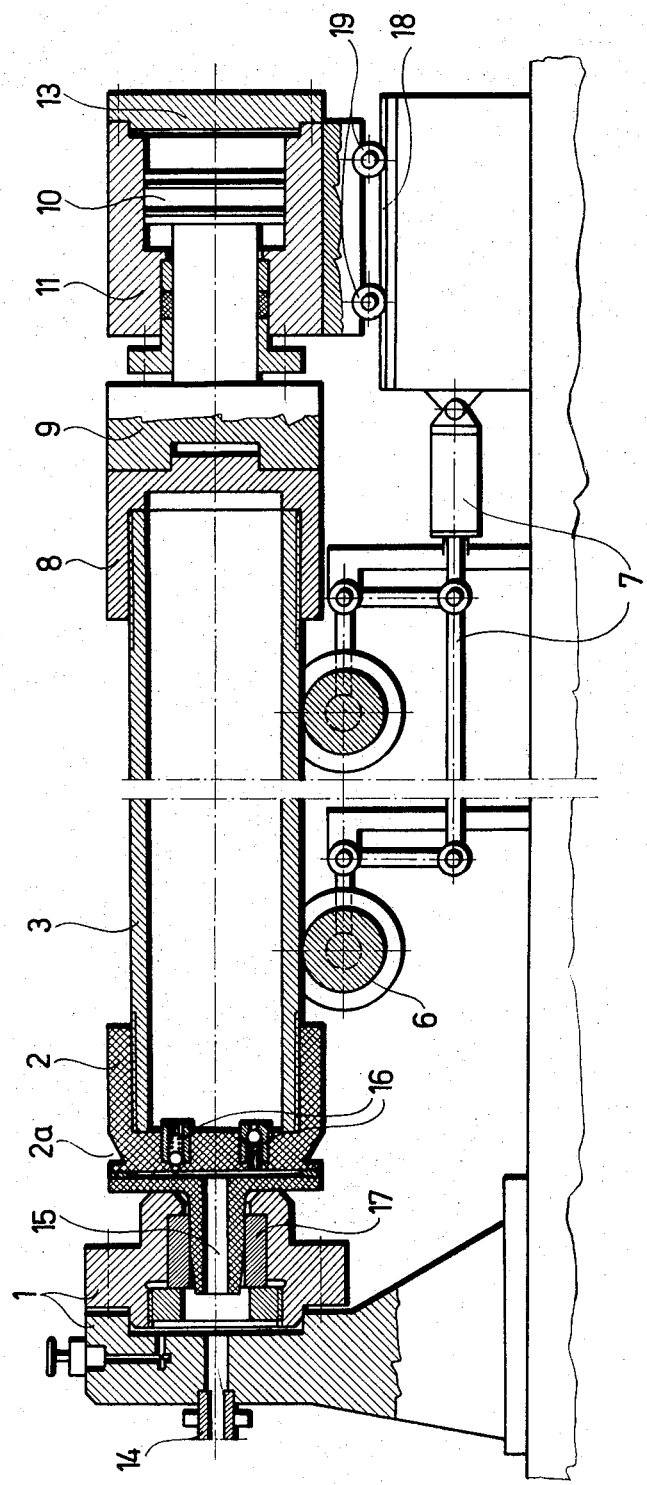

The invention is described, by way of example only, with reference to the accompanying drawing, in which:

FIG. 1 is a schematic plan view of a preferred embodiment of a pressure testing machine according to this invention, and FIG. 2 is a longitudinal section of the machine shown in FIG. 1.

Referring to the drawing, a pressure testing machine according to this invention has a hollow, stationary sealing head 1 serving to seal an accurately machined, cylindrical, centrally bored extension of a cap 2 screwed on to one threaded end of a tube 3, and serving also to introduce liquid at test pressure through an inlet 15 of the cap 2 into the tube 3 after the latter has been pre-filled with low pressure liquid and de-aerated (vented). The extension of the cap 2 is surrounded by an annular seal 17 disposed in the sealing head 1. In use, venting of the sealing head 1 is effected by an expediently constructed and appropriately disposed venting valve 4. The other end of the tube 3 is closed by a cap 8 of generally similar configuration to cap 2.

Coupling dogs 5 are angularly displaceable about vertical axles secured on the sealing head 1, and during pressure testing couple the cap 2 to the sealing head 1 by engaging with splines or grooves 2a formed in the cap 2. Two low pressure, springbiased check valves or back pressure valves 16 are placed in the path of liquid flow between the inlet 15 and the interior of the tube 3. As the drawing shows, the valves 16 are arranged so that their valve-opening movements are mutually oppositely directed.

The tube 3 to be tested and pre-filled with low pressure liquid has its ends closed by the caps 2, 8, respectively, and after being placed into the testing machine, rests on a tiltable roller track 6. The pivots are shown in the drawing, from which it can be seen that the pivotal axes are normal to the longitudinal axis of the tube 3. In use, by simultaneously driving the rollers about their own axes, the tube 3 can be moved towards or away from the sealing head 1 through movement of the cap 2 into or out of sealing engagement with the head 1. Tilting of the roller track 6 is effected by a suitable actuating mechanism 7.

The cap 8 secured, also by screwing, to the other end of the tube 3 has a central boss supported in a recess in a supporting head 9. Movement of the head 9 in the tightening or slackening sense (to the left or to the right, as seen in FIG. 2) is effected by an hydraulic ram 10 mounted on a movable stand 11. The movable stand 11 is supported by way of rollers 19 on rails 18 fixed to the machine bed. Means, not shown, are provided to lock the rollers 19 in any desired position along the rails 18. Spindles 12 interconnect the stationary sealing head 1 and the movable stand 11, and are respectively fixedly and detachably secured to the sealing head 1 and the stand 11. The movable stand 11 may be set into a new position relative to the stationary sealing head 1 along the spindles 12 whenever the length of a new series of tubes to be investigated differs from that of a previously tested series by an amount greater than that which the stroke of the hydraulic ram 10 can bridge over.

FIGS. 1 and 2 show the position where the hydraulic ram 10 guided in the movable stand 11 presses the tube 3 towards the stationary sealing head 1 under the influence of low pressure liquid flowing through a pipe 13 communicating with the piston of the ram 10. In this position, the coupling dogs 5 engage the cap 2 via the grooves 2a, and the head 1 is filled with low pressure liquid via a pipe 14, while the venting valve 4 is opened. After complete air venting of the sealing head 1, the venting valve 4 is closed. Then, the pipe 14 is switched over (by means not shown) to means (not shown) for supplying liquid at the high pressure necessary for testing, whereby liquid pressure rises appropriately in the sealing head 1.

Under the influence of increasing pressure, the upper (as viewed) low pressure check valve 16 placed after the inlet opening 15 of cap 2 opens against the force of its closing spring and the pressure causes liquid to flow into the tube 3 until eventually test pressure conditions are reached in the tube 3. Simultaneously with the switching-over of the pipe 14, the pipe 13 is also connected to the pipe 14 by way of a pressure-reducing device (not shown) in such a manner that the pressure in the pipe 13 remains less than that in the pipe 14 by a preset constant amount, or remains at zero. Under the influence of this reduced pressure the hydraulic ram 10 presses the supporting head 9 on to the cap 8 with a pressure determined as a function of the pressure arising in the tube 3.

Two different forces act in operation on the cap 8: on the one hand, a tube tensioning force set up by the pressure in tube 3 and against the dogs 5, and on the other hand, the force exerted by the supporting head 9, that is to say, the force directed against the sealing head 1 and causing the pressure in the tube 3. The set value of the pressure drop between the pipes 14 and 13, and the dimensions of the hydraulic ram enables the production of a resultant compressive force, tensile force or closing force of any desired magnitude.

After reaching the test pressure and after elapsing of the stipulated waiting period, the pressure is reduced in the pipe 14, the excess liquid — which had produced the test pressure — is drained through the lower low pressure check valve 16 and thus liquid pressure is reduced in the tube 3 also, and simultaneously therewith the hydraulic ram 10 decreases its pressure exerted on the cap 8.

When the liquid pressure has reduced to zero in the pipe 14, this means that the testing of tube 3 has terminated. The hydraulic ram 10 is retracted to remove the supporting head 9 from the cap 8, the coupling dogs 5 are disengaged from the groove 2a, the tilting roller track 6 is actuated to draw the tube 3 away from the sealing head 1, and finally the pre-filled tube 3 is removed from the testing machine.

It will be appreciated that, in addition to the already enumerated advantages of the pressure testing machine of this invention, a further advantage accrues from the fact that the diameter of the seal 17 is independent of the diameter of the tube being tested.

We claim as our invention:

1. A pressure testing machine for testing tubes by the application of high liquid pressures, comprising a first, stationary sealing head for gripping the tube being tested, a first closure cap adapted sealingly to be secured to one end of the said tube, means fixedly mounting said first closure cap on said head, a liquid inlet aperture in the first cap, a permanent seal for connecting the first cap to the stationary sealing head, the dimensions of said permanent seal being independent of the diameter of said tube, means in said stationary sealing head for connecting the said inlet aperture to a source of high pressure liquid, a second sealing head displaceable along the axis of said tube to accommodate the entire length of the tube, a second closure cap adapted seal-ingly to be secured to the other end of said tube thereby sealingly to close said other end of said tube, a movable supporting member connected to the second cap, and pressure application means connecting said second sealing head to the said supporting member to exert in operation a force on said other end of the tube.

2. A machine as claimed in claim 1 wherein each tube end is threaded and each cap is screwed to the associated tube end.

3. A machine as claimed in claim 1 wherein two back pressure valves are arranged in the liquid flow path within said first cap between the said inlet aperture and the interior of said tube, the valves being arranged to open in mutually opposite directions.

4. A machine as claimed in claim 1 wherein said pressure application means is constituted by a ram guided for movement in said second sealing head in the longitudinal direction of the tube.

5. A machine as claimed in claim 4 wherein lockable rolling elements engaging with a track are provided on said second sealing head for effecting its displacement.

6. A machine as claimed in claim 1 wherein a groove is provided on said first cap, there being angularly displaceable dogs connected to the stationary sealing head for engaging the groove so as to couple said head to said cap.

7. A machine as claimed in claim 1 further including, for the support of said tube and for its removal from the machine after testing, a tiltable roller track is provided to support the tube, the tilting axis of the track being normal to the longitudinal axis of the tube and an actuating mechanism for the roller track.

8. A machine as claimed in claim 1 wherein longitudinally extending spindles interconnect the stationary sealing head and the movable support member in a relatively adjustable manner.

9. A machine as claimed in claim 1 wherein the means in the stationary sealing head for connection to a source of high pressure liquid is connected to the pressure application means by way of a pressure reducer and a pipe.

* * * * *